(12) United States Patent
Shiino

(10) Patent No.: US 8,914,172 B2
(45) Date of Patent: Dec. 16, 2014

(54) CONTROL METHOD AND DEVICE FOR HYBRID MOTOR

(75) Inventor: Toshikazu Shiino, Chigasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1565 days.

(21) Appl. No.: 12/186,310

(22) Filed: Aug. 5, 2008

(65) Prior Publication Data

US 2009/0043437 A1 Feb. 12, 2009

(30) Foreign Application Priority Data

Aug. 7, 2007 (JP) ................................ 2007-205683

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60W 20/00* | (2006.01) | |
| *B60K 6/48* | (2007.10) | |
| *B60W 10/06* | (2006.01) | |
| *B60W 10/08* | (2006.01) | |
| *B60K 1/02* | (2006.01) | |

(52) U.S. Cl.
CPC .................. *B60W 20/00* (2013.01); *B60K 6/48* (2013.01); *B60W 10/06* (2013.01); *B60W 10/08* (2013.01); *B60K 1/02* (2013.01); *B60L 2240/445* (2013.01); *B60W 2510/068* (2013.01); *B60W 2540/12* (2013.01); *Y02T 10/54* (2013.01); *Y02T 10/6221* (2013.01); *Y02T 10/6286* (2013.01); *Y02T 10/48* (2013.01); *B60Y 2300/476* (2013.01); *Y10S 903/902* (2013.01)

USPC .............................................. 701/22; 903/902

(58) Field of Classification Search
USPC ............................................ 701/22; 903/902
See application file for complete search history.

(56) References Cited

U.S. PATENT DOCUMENTS

| | | | | |
|---|---|---|---|---|
| 6,785,603 | B2* | 8/2004 | Inoue ............................. | 701/112 |
| 6,895,744 | B2* | 5/2005 | Osawa ........................... | 60/277 |
| 2001/0020789 | A1* | 9/2001 | Nakashima ................... | 290/40 C |
| 2002/0049115 | A1* | 4/2002 | Suzuki ............................ | 477/3 |
| 2006/0218903 | A1 | 10/2006 | Ogata | |

FOREIGN PATENT DOCUMENTS

| | | |
|---|---|---|
| CN | 1349903 A | 5/2002 |
| FR | 2 861 424 A1 | 4/2005 |
| JP | 10-288063 A | 10/1998 |
| JP | 2002-242661 A | 8/2002 |
| JP | 2003-239782 A | 8/2003 |
| JP | 2004-112995 A | 4/2004 |
| JP | 2005-133563 A | 5/2005 |
| JP | 2005-160252 A | 6/2005 |

\* cited by examiner

*Primary Examiner* — Imran Mustafa
(74) *Attorney, Agent, or Firm* — Foley & Lardner LLP

(57) ABSTRACT

A control device for a hybrid motor constituted by an internal combustion engine and an electric motor, which are connected via a clutch, stops the internal combustion engine when a predetermined deceleration condition is established, and prohibits stoppage of the internal combustion engine when the temperature of an exhaust gas purification catalyst interposed in an exhaust system of the internal combustion engine is higher than a first predetermined temperature, which is higher than an activity start temperature of the exhaust gas purification catalyst, even if the predetermined deceleration condition is established.

15 Claims, 15 Drawing Sheets

| | I | II | III |
|---|---|---|---|
| CATALYST TEMPERATURE | HIGH | ~ | APPROPRIATE |
| ENGINE OPERATION | ○ | ○ | × |
| F/ Cut | × | ○ | ○ |
| COASTING REGENERATION | ○ | × | ○ |
| COOPERATIVE REGENERATION | ○ | ○ | ○ |

|  | I | II | | III |
| --- | --- | --- | --- | --- |
|  |  | R/S UNDERWAY | OTHER |  |
| CATALYST TEMPERATURE | HIGH | ~ | | APPROPRIATE |
| ENGINE OPERATION |  | ○ | ○ | × |
| F/ Cut |  | × | ○ | ○ |
| COASTING REGENERATION |  | ○ | × | ○ |
| COOPERATIVE REGENERATION |  | ○ | ○ | ○ |

FIG. 11

| | I | | II | | | III |
|---|---|---|---|---|---|---|
| | REGENERATION UNDERWAY | OTHER | REGENERATION UNDERWAY | R/S UNDERWAY | OTHER | |
| CATALYST TEMPERATURE | HIGH | | ~ | | | APPROPRIATE |
| ENGINE OPERATION | ○ | ○ | ○ | ○ | ○ | × |
| F/Cut | × | × | × | × | ○ | ○ |
| COASTING REGENERATION | ○ | ○ | ○ | ○ | × | ○ |
| COOPERATIVE REGENERATION | ○ | ○ | ○ | ○ | ○ | ○ |
| ENGINE LOAD INCREASE AND REGENERATION CORRESPONDING TO ENGINE LOAD INCREASE | ○ | × | ○ | × | × | × |

FIG. 17

CONTROL METHOD AND DEVICE FOR HYBRID MOTOR

FIELD OF THE INVENTION

This invention relates to a control device and method for a hybrid motor that is constituted by an internal combustion engine and an electric motor connected via a clutch, and includes a mode in which driving of the internal combustion engine is stopped under at least a predetermined deceleration condition.

BACKGROUND OF THE INVENTION

A technique of preventing the temperature of an exhaust gas purification catalyst from decreasing to or below an active temperature by disengaging an engine from a drive shaft and halting a fuel supply to stop the engine from rotating when the temperature of the catalyst reaches or exceeds a predetermined temperature is known in the related art (see JP2004-112995A). According to this technique, exhaust emissions can be prevented from deteriorating when the engine is restarted.

SUMMARY OF THE INVENTION

With the technique described above, however, if an internal combustion engine is stopped when the catalyst is at a higher temperature than normal, for example immediately after continuously operating the internal combustion engine in a high output region, deterioration of the catalyst may be accelerated.

It is an object of this invention to ensure that durability can be secured in an exhaust gas purification catalyst during deceleration while maintaining the deceleration performance, fuel economy, and exhaust gas purification performance at favorable levels.

In order to achieve the above object, this invention provides a control device for a hybrid motor constituted by an internal combustion engine and an electric motor, which are connected via a clutch, comprising a temperature detection unit that detects a temperature of an exhaust gas purification catalyst interposed in an exhaust system of the internal combustion engine, and an internal combustion engine control unit that stops the internal combustion engine when a predetermined deceleration condition is established, and prohibits stoppage of the internal combustion engine when the temperature of the exhaust gas purification catalyst is higher than a first predetermined temperature, which is higher than an activity start temperature of the exhaust gas purification catalyst, even if the predetermined deceleration condition is established.

In order to achieve the above object, this invention further provides a control method for a hybrid motor constituted by an internal combustion engine and an electric motor, which are connected via a clutch, comprising detecting a temperature of an exhaust gas purification catalyst interposed in an exhaust system of the internal combustion engine, stopping the internal combustion engine when a predetermined deceleration condition is established, and prohibiting stoppage of the internal combustion engine when the temperature of the exhaust gas purification catalyst is higher than a first predetermined temperature, which is higher than an activity start temperature of the exhaust gas purification catalyst, even if the predetermined deceleration condition is established.

The details as well as other features and advantages of this invention are set forth in the remainder of the specification and are shown in the accompanying drawings.

BRIEF DESCRIPTION OF THE DRAWINGS

FIG. 11 is a view showing operations of each element in the second embodiment.

FIG. 17 is a view showing operations of each element in the third embodiment.

DESCRIPTION OF THE PREFERRED EMBODIMENTS

Figure 1:
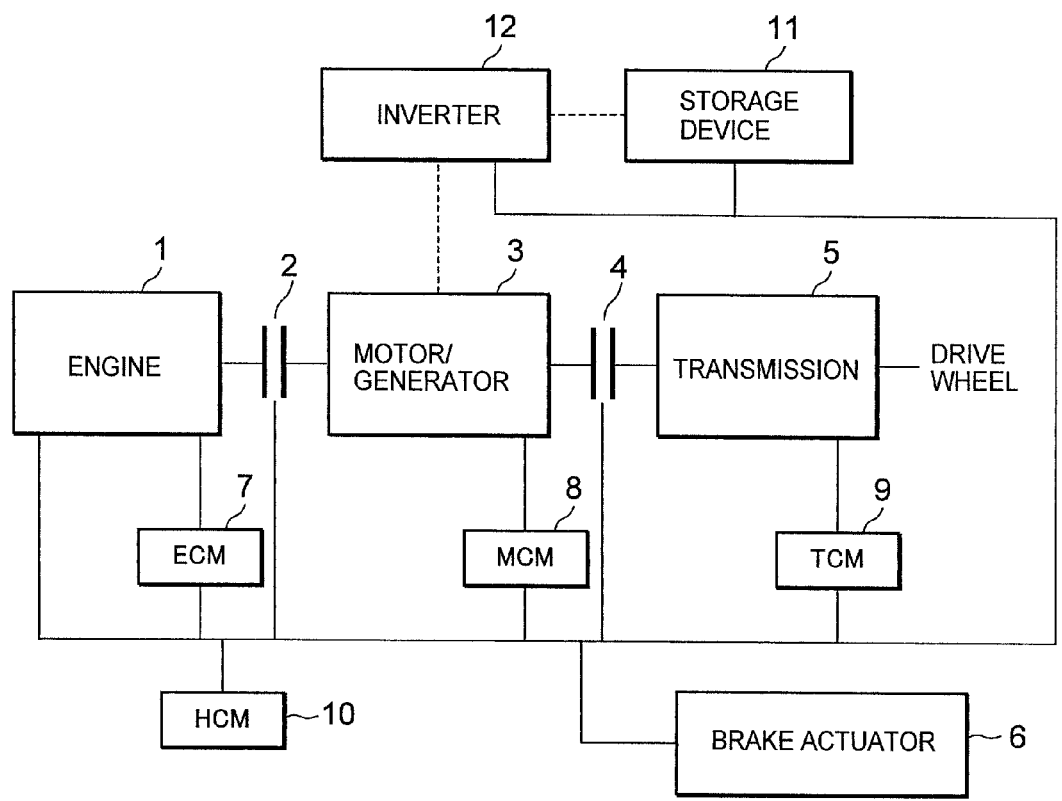
FIG. 1 is a block diagram showing an example of a power train for a hybrid vehicle according to an embodiment.

FIG. 1 is a view showing an example of a power train for a hybrid vehicle to which this invention is applied.

An output shaft of an engine (internal combustion engine) 1 is connected to a motor/generator 3 via a first clutch 2. The motor/generator 3 is an electric motor that also functions as a power generator. An output shaft of the motor/generator 3 is connected to a transmission 5 via a second clutch 4.

A brake actuator 6 regulates oil pressure transmitted from a brake oil pressure source to a wheel cylinder of each vehicle wheel.

An engine control module (ECM) 7 controls the engine 1. A motor control module (MCM) 8 controls the motor/generator 3. A transmission control module (TCM) 9 controls the transmission 5. The ECM 7, MCM 8, and TCM 9 are controlled comprehensively by commands from a hybrid control module (HCM) 10.

A storage device 11 such as a battery supplies power to the respective control modules 7 to 10. When the motor/generator 3 is driven as a motor, an inverter 12 converts direct current power from the storage device 11 into alternating current power, and outputs the alternating current power to the motor/generator 3. Further, when the motor/generator 3 functions as a generator, the inverter 12 converts generated alternating current power from the motor/generator 3 into direct current power, and outputs the direct current power to the storage device 11.

The motor/generator 3 includes both a travel driving function and a function for starting the engine 1. When the vehicle is traveling, the second clutch 4 is connected. If, at this time, the driving force of the engine 1 is used by the engine 1 alone or by both the engine 1 and the motor/generator 3, the first clutch 2 is also connected. When starting the engine 1, the second clutch 4 is disengaged and the first clutch 2 is connected, whereby cranking is performed.

Figure 2:
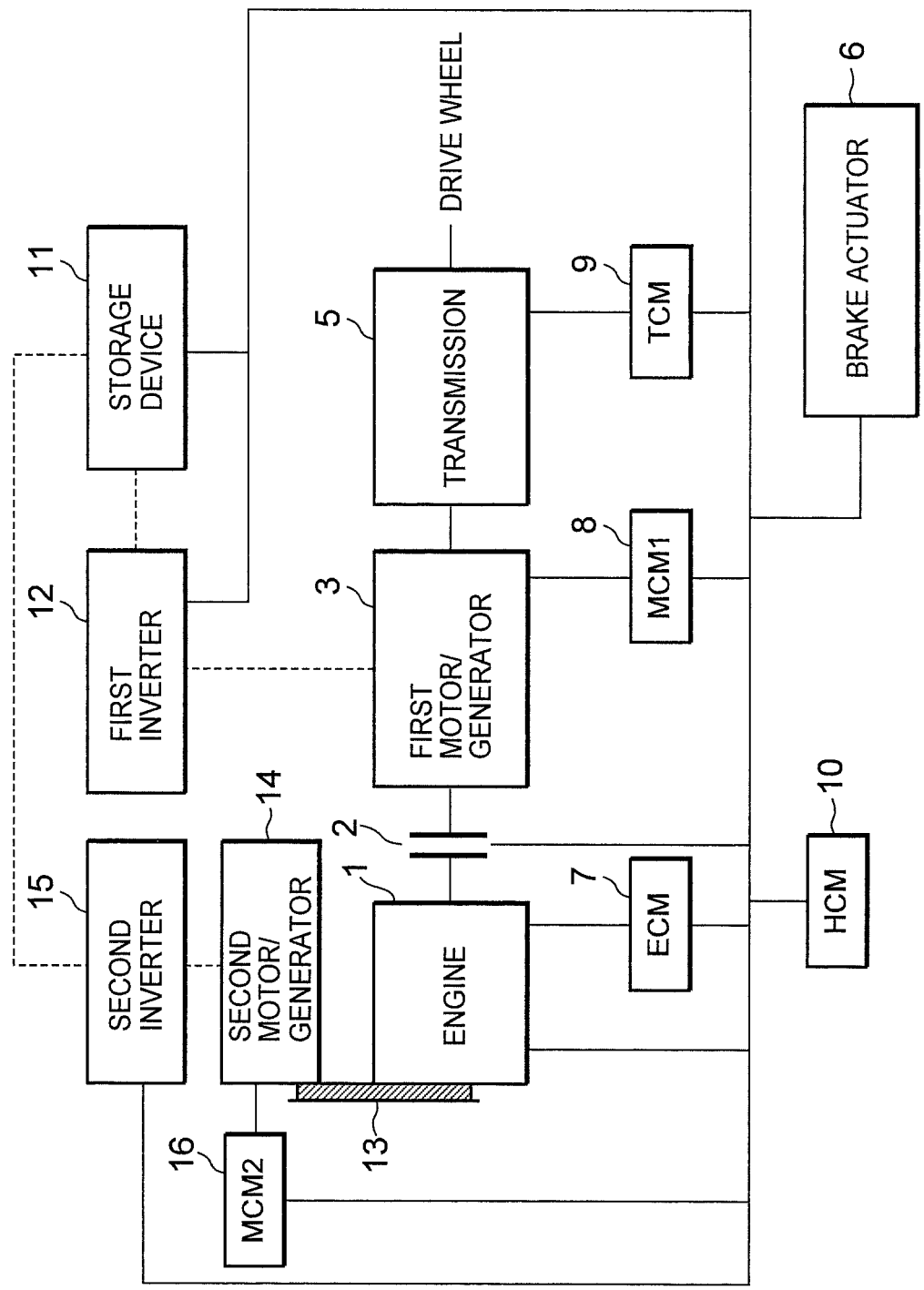
FIG. 2 is a block diagram showing another example of a power train for a hybrid vehicle according to an embodiment.

FIG. 2 is a view showing another example of a power train for a hybrid vehicle to which this invention is applied. This constitution differs from the constitution of FIG. 1 in the following manner. First, a second motor/generator 14 for engine start-up, which operates in conjunction with the engine 1 via a belt 13, is provided in addition to a first motor/generator 3 for travel. A second inverter 15 is provided between the second motor/generator 14 and the storage device 11. Further, a second motor control module 16 is provided for issuing commands to the second motor/generator 14. The second clutch 4 is omitted.

It should be noted that this invention is not limited to the two constitutions described above, and as long as the invention includes a mode in which the engine is stopped at least when an accelerator is OFF or a brake is ON, the invention may be applied to various other well-known hybrid systems.

Figure 3:
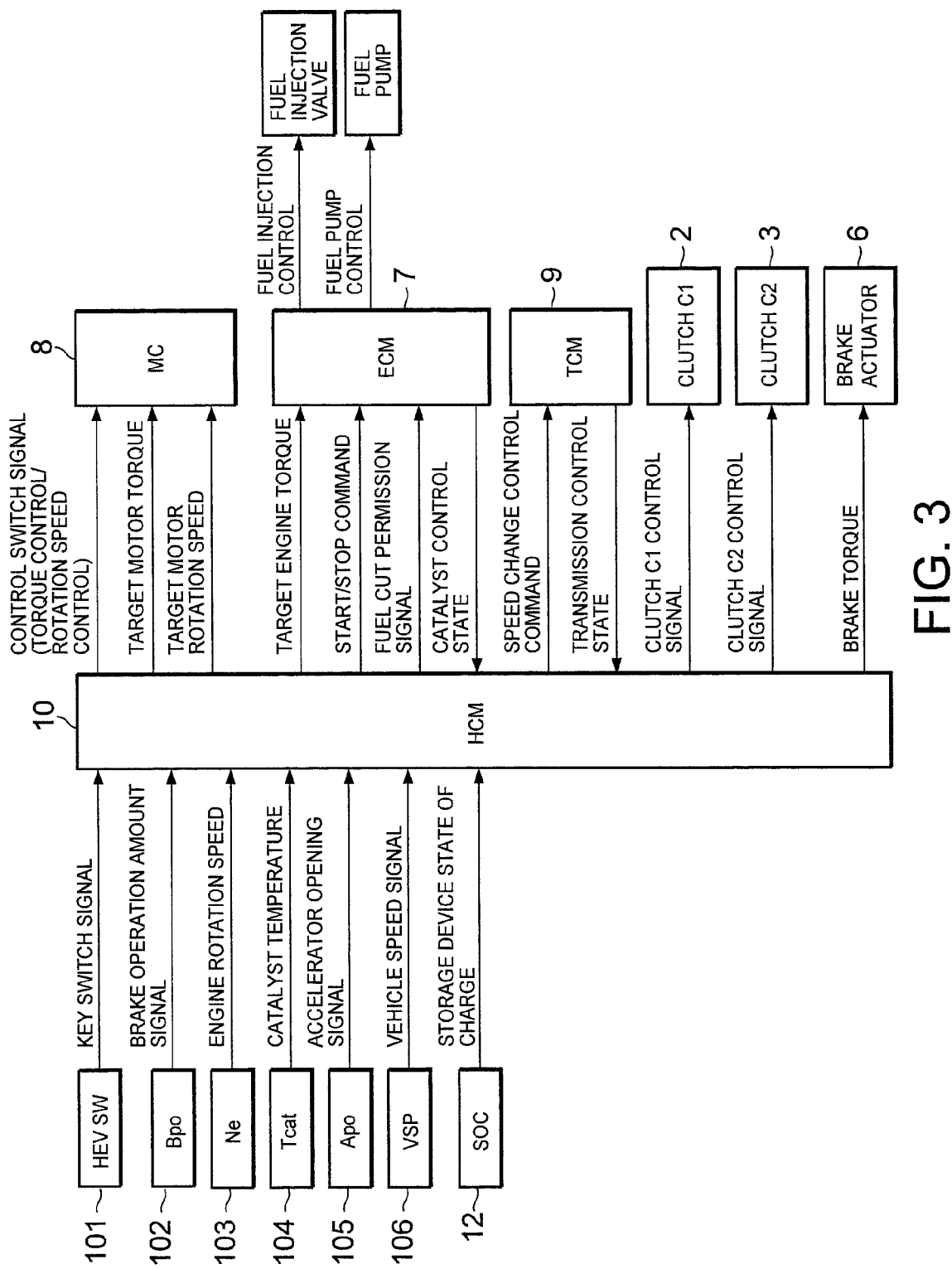
FIG. 3 is a view showing an input/output state of a hybrid control module.

FIG. 3 is a view showing the input/output states of the ECM 7, MCM 8, TCM 9, and HCM 10. The ECM7, MCM 8, TCM 9, and HCM 10 are respectively programmable controllers comprising a microcomputer provided with a central processing unit (CPU), read-only memory (ROM), random access memory (RAM) and input/output interface (I/O interface). These controllers may comprise plural microcomputers.

As detection signals from various types of sensors, a key switch signal HEVSW from a key switch 101, a brake operation amount signal Bpo from a brake pedal sensor 102, an engine rotation speed signal Ne from an engine rotation speed sensor 103, a catalyst temperature signal Tcat from a catalyst temperature sensor 104, an accelerator opening signal Apo from an accelerator opening sensor 105, a vehicle speed signal VSP from a vehicle speed sensor 106, and a state of charge (charge amount) SOC of the storage device 11 are input into the HCM 10.

The HCM 10 outputs a control switching signal for switching between torque control of the motor/generator 3 and rotation speed control, a target motor torque signal, and a target motor rotation speed signal to the MCM 8. In particular, when a predetermined deceleration condition is established, the HCM 10 outputs a command signal for causing the motor/generator 3 to perform a regeneration operation to the MCM 8.

Further, the HCM 10 outputs a target engine torque signal, an engine 1 start/ stop command signal, and a fuel cut permission signal to the ECM 7, and inputs a catalyst control state signal indicating the control state of a catalyst from the ECM 7. In particular, when a predetermined deceleration condition (engine stopping condition) is established, the HCM 10 outputs an engine 1 stop command signal to the ECM 7. The ECM 7 outputs a fuel injection control signal to a fuel injection valve of the engine 1, and outputs a fuel pump control signal to a fuel pump.

Further, the HCM 10 outputs a transmission control command to the TCM 9, and inputs a transmission control state signal indicating the control state of the transmission from the TCM 9.

In addition, the HCM 10 outputs a clutch control signal C1, a clutch control signal C2, and a brake torque signal Tbr to the first clutch 2, the second clutch 4, and the brake actuator 6, respectively.

In FIG. 3, the number of clutches is dependent on the constitution of the hybrid system. In this embodiment, a clutch that disengages the engine 1 from the driving system is indicated as a clutch C1.

Figure 4:
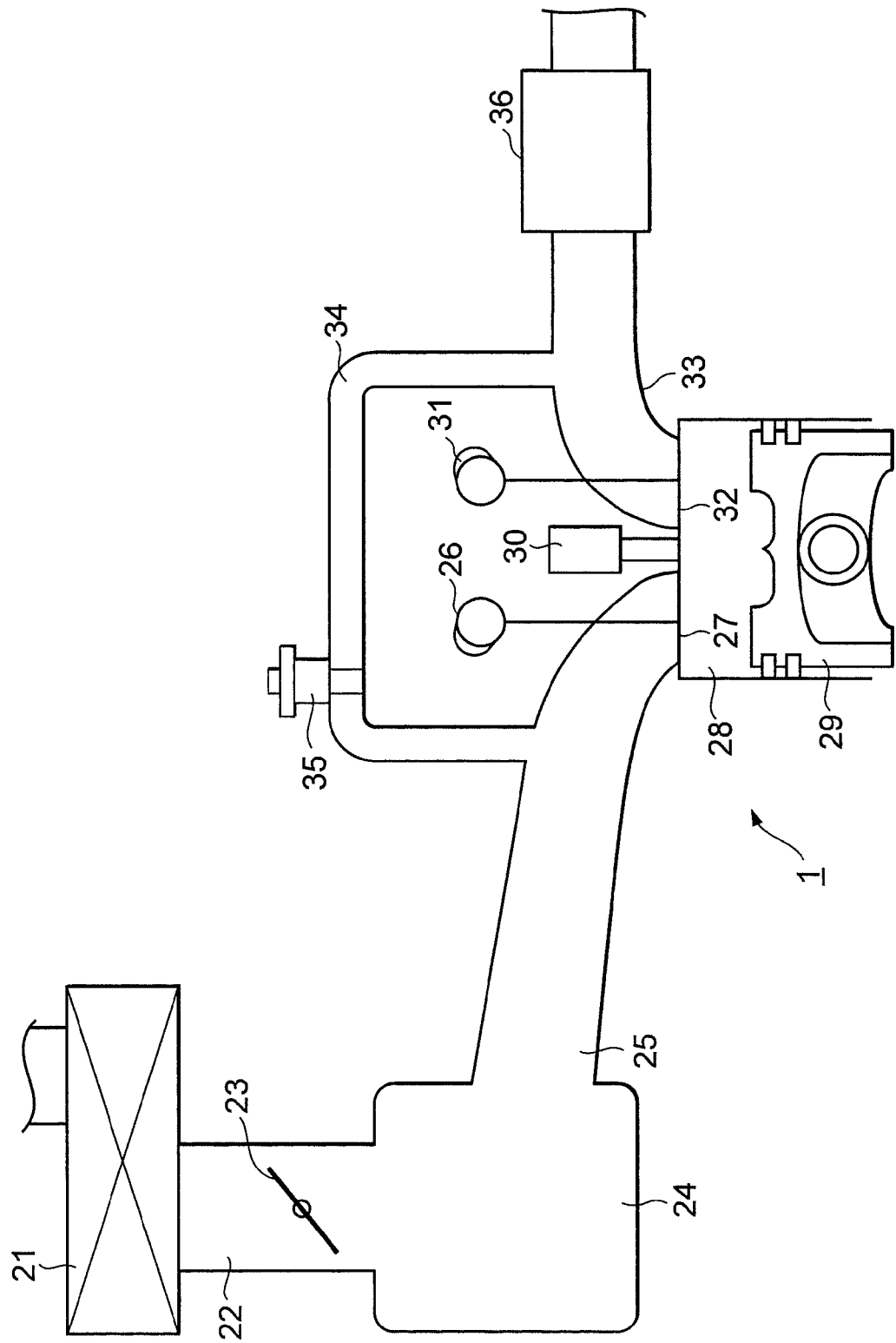
FIG. 4 is a view showing an example of an engine according to a first embodiment.

FIG. 4 is a view showing an example of the engine 1. The engine 1 is a diesel engine in which intake air is aspirated from an air cleaner 21 into a cylinder 28 via an intake passage 22, an intake throttle valve 23, a collector 24, an intake manifold 25, and an intake valve 27 that is driven to open and close by an intake cam 26.

A piston 29 is inserted into the cylinder 28, and fuel is injected into the cylinder 28 by a fuel injection valve 30. Fuel exhaust gas is discharged to an exhaust passage 33 via an exhaust valve 32 that is driven to open and close by an exhaust cam 31.

A part of the exhaust gas is introduced into an EGR passage 34 as EGR gas. The EGR gas amount is controlled by an EGR valve 35, whereupon the EGR gas is circulated to the intake manifold 25.

An exhaust gas purification catalyst 36 constituted by an oxidation catalyst such as a three-way catalyst is mounted on a downstream portion of the exhaust passage 33.

Control is performed during deceleration in the system having the constitution described above.

Figure 5:
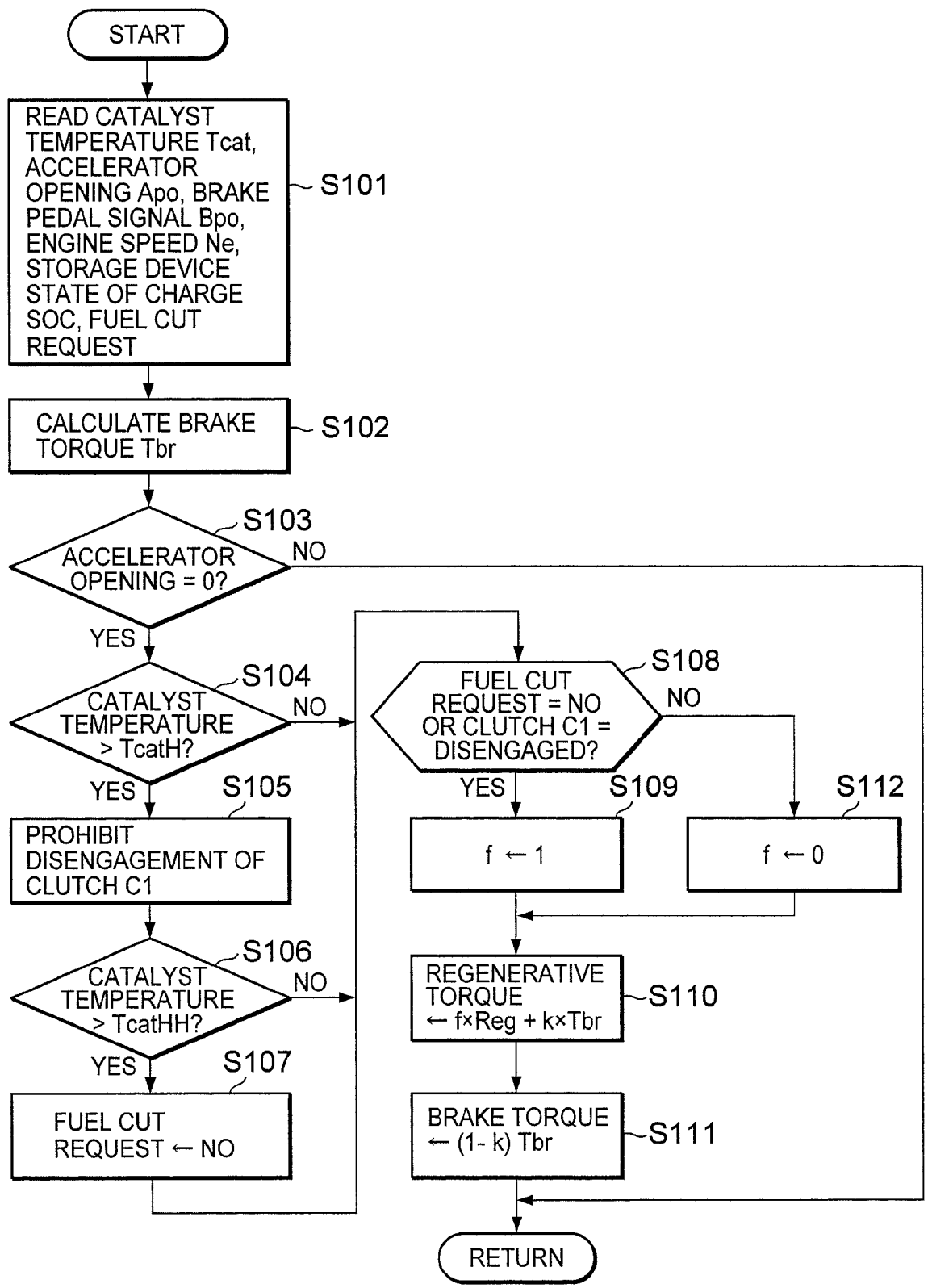
FIG. 5 is a flowchart showing control according to the first embodiment.

FIG. 5 shows a control flow according to a first embodiment. This control is executed in the HCM 10.

In a step S101, various signals input into the HCM 10 prior to a fuel cut are read. The various signals include the catalyst temperature Tcat, the accelerator opening signal Apo, the brake operation amount signal Bpo, the storage device state of charge (charge amount) SOC, and a fuel cut request signal. The ECM 7 determines the fuel cut request, and once the presence or absence of a request has finally been determined in this flow, the request is re-transmitted to the ECM 7, whereupon an actual fuel cut is performed on the basis of the presence or absence of the request.

In a step S102, the brake torque Tbr of a drive wheel is calculated on the basis of the brake operation amount signal Bpo. Typically, the depression force of the brake pedal is used as the brake operation amount signal Bpo such that the brake torque Tbr is calculated in a form that is substantially commensurate with the pedal depression force. However, the brake torque Tbr may be calculated in consideration of known brake assistance techniques and so on.

In a step S103, a determination is made as to whether or not the accelerator opening Apo=0, or in other words whether or not the accelerator is OFF. When it is determined that the accelerator is OFF, the routine advances to a step S104.

In the step S104, a determination is made as to whether or not the catalyst temperature Tcat is higher than a first predetermined temperature TcatH. When it is determined that the catalyst temperature Tcat is higher than the first predetermined temperature TcatH, the routine advances to a step S105, where disengagement of the (first) clutch C1 is prohibited, and the engine 1 is maintained in a rotary state. Namely, stoppage of the engine 1 is prohibited.

In a step S106, a determination is made as to whether or not the catalyst temperature Tcat is higher than a second predetermined temperature TcatHH, which is higher than TcatH. When it is determined that the catalyst temperature Tcat is higher than the second predetermined temperature TcatHH, the routine advances to a step S107, where the fuel cut request is canceled and fuel cuts are prohibited. The fuel injection amount at this time is set such that a net torque of the engine 1 is zero, for example, or in other words at a fuel injection amount for generating the torque required to rotate the engine 1 in synchronization with the rotation of the motor/generator 3, which is connected via the clutch C1.

Figure 6:
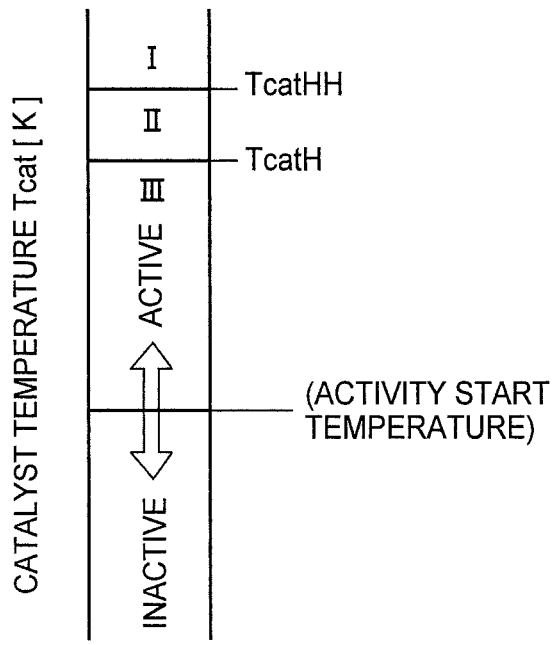
FIG. 6 is a view illustrating the setting point of a catalyst temperature at which control is switched, according to each embodiment.

FIG. 6 shows an example of the manner in which the first predetermined temperature TcatH and the second predetermined temperature TcatHH are set. As shown in FIG. 6, the first predetermined temperature TcatH and second predetermined temperature TcatHH are both set higher than a temperature at which the catalyst begins to be active.

When the engine is stopped in the state where the catalyst temperature is high, high-temperature gas remains in the catalyst, and therefore heat radiation through the exhaust gas cannot be performed, with the result that the catalyst temperature stops falling. In this case, deterioration of the catalyst is accelerated.

Therefore, the first predetermined temperature TcatH is set at a value near a lower limit value of the catalyst temperature at which the catalyst is predicted to deteriorate due to an engine stoppage such as that described above. As a result, a reduction in catalyst activity due to excessive cooling can be prevented.

Further, if a fuel cut request is issued when only engine stoppages are prohibited and fuel cuts are not prohibited, exhaust gas=air is established, and as a result, a cooling action caused by a reduction in the exhaust gas temperature increases.

However, if the catalyst temperature increases further and highly concentrated oxygen in the exhaust gas (air) at the time of the fuel cut comes into contact with the catalyst immediately after a high-temperature operation performed prior to the fuel cut while the exhaust gas still contains unburned components, an oxidation reaction occurs in the catalyst, leading to a further temperature increase. In this case, the catalyst deteriorates rapidly with the likelihood of burnout.

Therefore, the second predetermined temperature TcatHH is set at a value in the vicinity of a lower limit value of the catalyst temperature at which the catalyst temperature is predicted to rise due to an oxidation reaction in the catalyst above the cooling action of the exhaust gas (=air) when fuel cuts are performed.

Hence, when the catalyst temperature Tcat rises above the first predetermined temperature TcatH, engine stoppages are prohibited such that cooling is performed by the exhaust gas, and when the catalyst temperature Tcat rises further so as to exceed the second predetermined temperature TcatHH, both engine stoppages and fuel cuts are prohibited such that the oxygen concentration of the exhaust gas is reduced through combustion. As a result, an oxidation reaction in the catalyst can be suppressed, an increase in the catalyst temperature can be prevented, and durability can be secured in the catalyst.

Further, when the catalyst temperature Tcat is equal to or lower than the first predetermined temperature TcatH, both engine stoppages and fuel cuts are not prohibited, preventing reductions in the catalyst temperature, and therefore reductions in catalyst activity can be prevented. As a result, fuel economy and exhaust gas purification performance can be maintained at favorable levels.

Once the presence or absence of a fuel cut has been determined in this manner, the routine advances to a step S108, where a determination is made as to whether or not a fuel cut request has been issued or whether or not the clutch C1 is disengaged. When a fuel cut has not been issued or the clutch C1 is disengaged, i.e. when engine braking is not active, the routine advances to a step S109. In the step S109, a flag f for covering a braking amount corresponding to engine braking using power regeneration for causing the motor/generator 3 to function as a generator is set to 1. On the other hand, a negative determination in the step S108 indicates that engine braking is active, and therefore the routine advances to a step S112, where the flag f is set to 0.

In a step S110, a target regenerative torque of the motor/generator 3 is calculated using the following Equation (1).

$$\text{Target regenerative torque} = f \times \text{Reg} + k \times Tbr \quad (1)$$

Here, Reg is a torque corresponding to engine braking (coasting regeneration), which is added as f=1 when the clutch C1 is disengaged or fuel cuts are prohibited, as described above.

Figure 7:
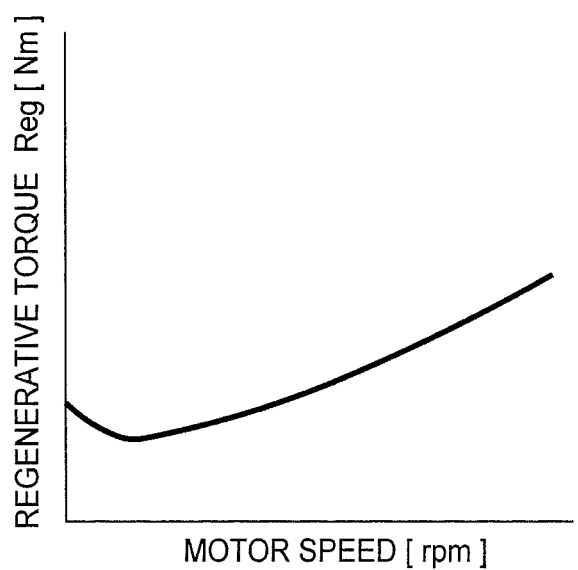
FIG. 7 is a view showing an example of the characteristics of a torque Reg corresponding to engine braking used in each embodiment.

FIG. 7 is a view showing an example of the characteristics of the torque Reg corresponding to engine braking. As shown in FIG. 7, as the motor speed increases, the torque Reg corresponding to engine braking also increases, and when the motor speed is in the vicinity of zero, a torque required for rotation activation increases.

Further, in Equation (1), k is a coefficient indicating a ratio of the regenerative torque to the brake torque Tbr, which is determined in accordance with the deceleration of the vehicle (cooperative regeneration), for example.

Figures 8, 9:
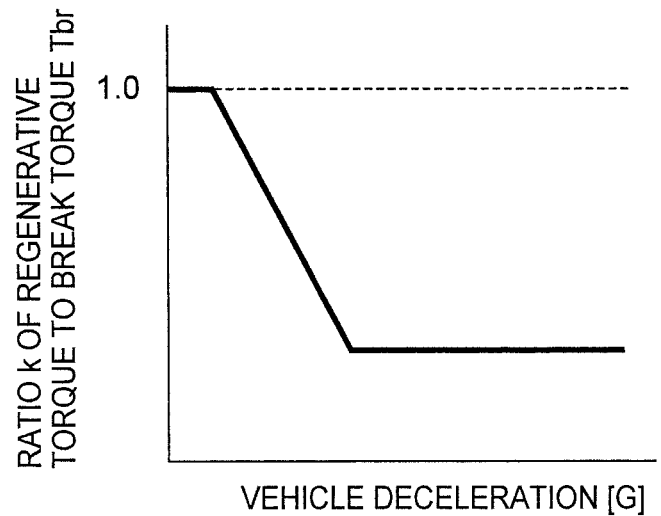
FIG. 8 is a view showing an example of the characteristics of a coefficient k of a proportion of rotary torque within cooperative regeneration, which is used in each embodiment.
FIG. 9 is a view showing operations of each element in the first embodiment.

FIG. 8 is a view showing an example of the characteristics of the coefficient k. When the deceleration of the vehicle is small, the proportion thereof that can be covered by regenerative torque is large, and therefore the coefficient k may be increased, but when the deceleration increases, the proportion thereof that can be covered by regenerative torque decreases, and therefore the coefficient k is reduced.

Hence, by performing cooperative regeneration to regenerate power using a part of the braking force, fuel economy can be improved while maintaining the catalyst cooling performance and the vehicle deceleration performance.

Finally, in a step S111, a cooperative regenerative torque (k×Tbr) is subtracted from the brake torque Tbr, and the result is set as the mechanical brake torque of the drive wheel. It should be noted that when the brake pedal is released such that the brake is inoperative (brake OFF), the brake torque Tbr=0, and this control is also executed during deceleration when only the accelerator pedal is released (accelerator opening=0).

Further, when the brake is OFF and an engine braking operation is underway during a fuel cut, a reduction in the catalyst cooling function caused by the pump action (air supply) during engine braking can be prevented by ensuring that power regeneration is not performed by the motor/generator 3. An excessive increase in the deceleration can also be prevented.

FIG. 9 is a view showing the operations of each element in this embodiment. I to III in FIG. 9 indicate the temperature regions shown in FIG. 6 (likewise in FIGS. 11 and 17, to be described below). It should be noted that when the catalyst temperature shifts to a temperature region III which is lower than the first predetermined temperature TcatH, control is switched to the temperature region III even during rich spike processing. In other words, the engine is stopped quickly, oxygen inflow to the catalyst is suppressed as far as possible, and a reduction in the temperature of the catalyst accompanying the inflow of low-temperature exhaust gas is prevented.

According to the embodiment described above, by controlling engine stoppages and fuel cuts in accordance with the catalyst temperature, overheating of the catalyst can be prevented, thereby securing durability in the catalyst, and excessive cooling of the catalyst can also be prevented, thereby preventing a reduction in catalyst activity.

Further, by adjusting the proportion of regenerative torque in accordance with the presence or absence of engine braking, which is switched in this control, the required brake torque can be secured such that the deceleration performance is maintained, and the proportion of regenerative torque can be increased to a maximum, thereby improving the power regeneration efficiency. As a result, an improvement in fuel economy can be achieved.

Although a diesel engine was described in this embodiment, this embodiment may be applied in a completely identical manner to a gasoline engine.

Next, a second embodiment will be described.

In the second embodiment, a NOx trap catalyst is used as the exhaust gas purification catalyst 36 shown in FIG. 4.

The NOx trap catalyst traps NOx contained in the exhaust gas that flows in when an exhaust gas air-fuel ratio is lean (when oxygen is in excess), and releases and purifies the trapped NOx when the exhaust gas air-fuel ratio is rich (when fuel is in excess). Using this characteristic, so-called rich spike processing is performed to release and purify the NOx by forcefully enriching the air-fuel ratio when at least a predetermined amount of NOx has been trapped in the NOx trap catalyst.

A NOx trap catalyst functions to oxidize inflowing exhaust components (HC, CO) by supporting an oxidation catalyst made of a noble metal (a noble metal such as Pt). However, a catalyst (a three-way catalyst or the like) supporting an oxidation catalyst may be disposed independently, in addition to the NOx trap catalyst.

In a diesel engine, control of the exhaust gas air-fuel ratio is performed by throttling the intake air using the intake throttle valve 23, increasing the EGR amount using the EGR valve 35, or performing both of these measures together in order to adjust the new air amount. It should be noted that the second embodiment may also be applied to a device in which a NOx trap catalyst is provided in a gasoline engine. In this case, the NOx in the NOx trap catalyst of the gasoline engine is released and purified by increasing the fuel injection amount and canceling out the torque increase by subjecting the ignition timing to retardation control and so on.

In the control of the first embodiment, even when a NOx trap catalyst is provided and rich spike processing is performed, fuel cuts are not prohibited in a case where the vehicle decelerates during the rich spike processing and the catalyst temperature is in a temperature region II. In this case, when a fuel cut mode is entered during the rich spike processing such that the rich spike processing is interrupted, the oxygen in the exhaust gas (air) is stored in the catalyst during the fuel cut. When the rich spike processing is resumed thereafter, a reduction component (HC) in the exhaust gas, which is generated by enrichment, is consumed during reduction of the stored oxygen at the start of resumption, leading to a delay in the reduction and purification of the NOx. As a result, reductions in the fuel economy and the exhaust gas purification performance occur.

Therefore, in the second embodiment, when the catalyst temperature Tcat is higher than the first predetermined temperature TcatH and equal to or lower than the second predetermined temperature TcatHH (i.e. in the temperature region II), a determination is made as to whether or not rich spike processing is underway by reading the control state of the catalyst, and when rich spike processing is underway, fuel cuts are prohibited.

Figure 10:
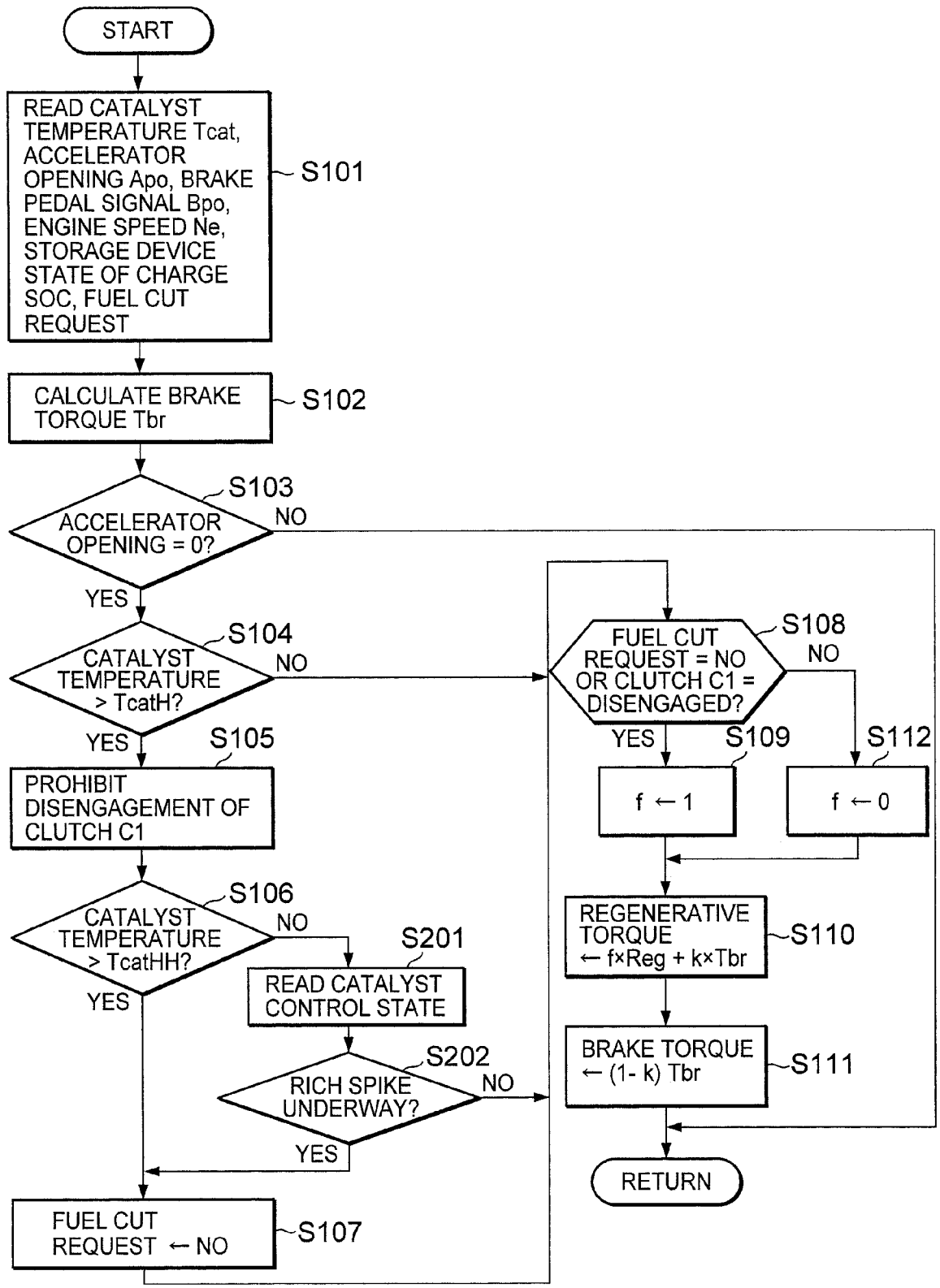
FIG. 10 is a flowchart showing control according to a second embodiment.

FIG. 10 shows the control flow of the second embodiment. The control flow shown in FIG. 10 differs from the control flow shown in FIG. 5 in the processing of a step S201 and a step S202.

When the catalyst temperature Tcat is in the temperature region II, the control state of the catalyst is read in the step S201. Next, in the step S202, a determination is made as to whether or not rich spike processing is underway. When it is determined that rich spike processing is underway, the routine advances to the step S107, where fuel cuts are prohibited. When it is determined that rich spike processing is not underway, on the other hand, the routine advances to the step S108 without prohibiting fuel cuts.

It should be noted that the first predetermined temperature TcatH and second predetermined temperature TcatHH are set at respectively appropriate values according to the catalyst type, for example a three-way catalyst or a NOx trap catalyst.

By prohibiting fuel cuts such that rich spike processing is continued when rich spike processing is underway, the fuel economy and exhaust gas purification performance can be maintained at favorable levels without delays in NOx reduction and purification.

It should be noted that when the net torque of the engine 1 is greater than zero during rich spike processing, the corresponding amount is added to the regenerative torque of the motor/generator 3, and thus the amount of regenerated power can be increased.

FIG. 11 is a view showing the operations of each element of this embodiment. In FIG. 11, a rich spike is indicated by R/S.

Next, a third embodiment will be described.

Figure 12:
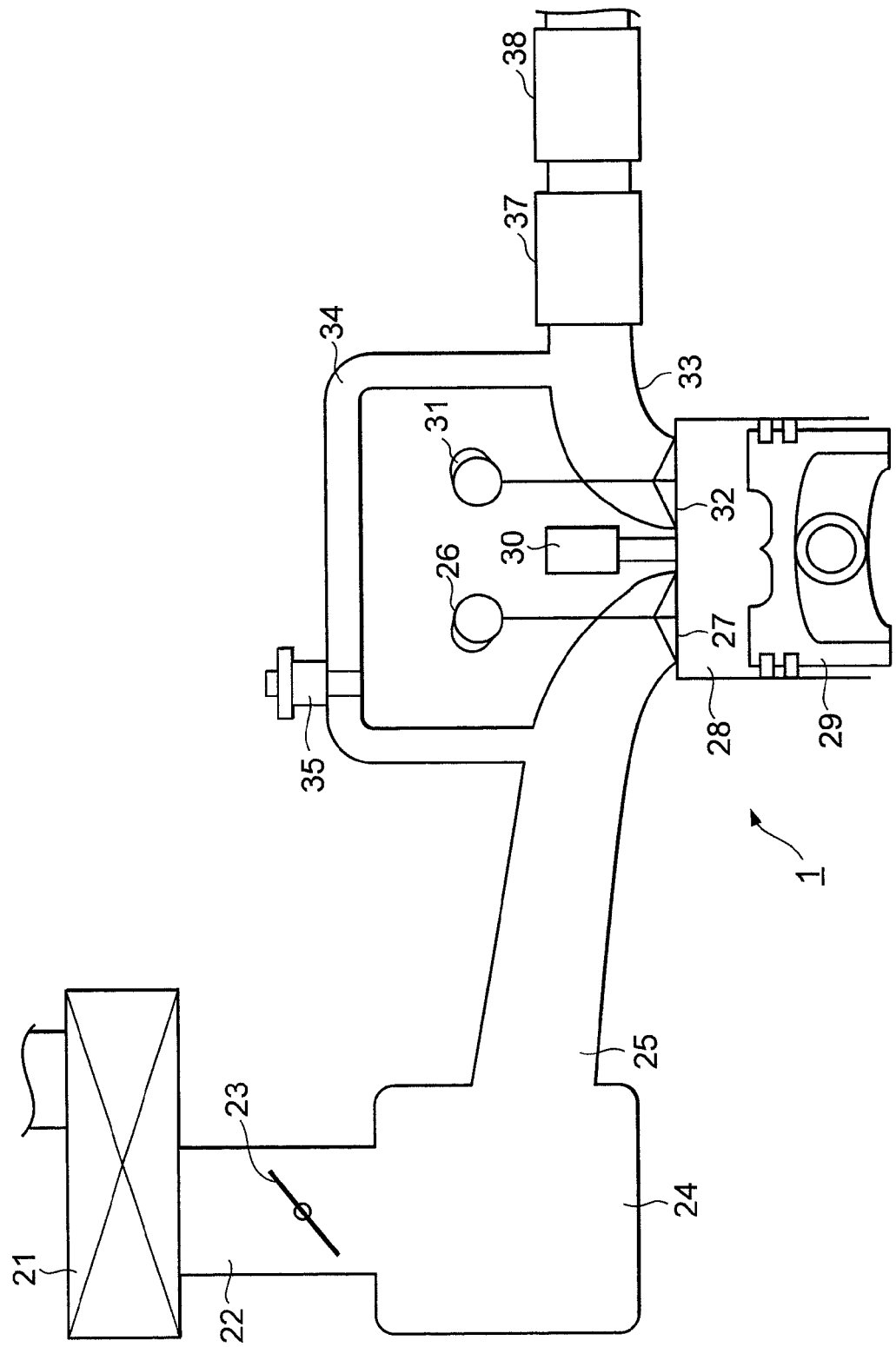
FIG. 12 is a view showing an example of an engine according to a third embodiment.

FIG. 12 is a view showing an example of an engine according to the third embodiment. In the third embodiment, as shown in FIG. 12, a NOx trap catalyst 37 and a diesel particulate filter (to be referred to hereafter as "DPF") 38 are provided as exhaust gas purification catalysts. The positions of the NOx trap catalyst 37 and DPF 38 may be reversed. Further, the DPF 38 may be caused to support a NOx trap catalyst to form an integral constitution, or a catalyst supporting an oxidation catalyst may be provided independently, in addition to the NOx trap catalyst 37 and the DPF 38.

The NOx trap catalyst 37 functions as described in the second embodiment. However, when a fuel containing sulfur (S) is used, sulfur poisoning regeneration processing is performed, as is well known. More specifically, a sulfur poisoning accumulation amount in the NOx trap catalyst is detected, and when the accumulation amount reaches or exceeds a predetermined amount, processing is performed to remove the sulfur poisoning by raising the exhaust gas temperature and enriching the exhaust gas air-fuel ratio.

The DPF 38 has a particulate matter (PM) trapping function for trapping PM contained in the exhaust gas. It should be noted that the DPF 38 also functions to oxidize inflowing exhaust gas components (HC, CO) by being caused to support an oxidation catalyst (made of a noble metal). DPF regeneration processing is also performed on the DPF 38. More specifically, a trapped PM amount is detected, and when the trapped PM amount reaches or exceeds a predetermined amount, processing is performed to remove the PM by raising the exhaust gas temperature and enriching the exhaust gas air-fuel ratio.

Control of the exhaust gas air-fuel ratio during sulfur poisoning regeneration and DPF regeneration is performed by throttling the intake air using the intake throttle valve 23, increasing the EGR amount using the EGR valve 35, or performing both of these measures together, similarly to the control performing during a rich spike.

The richness of the exhaust gas air-fuel ratio during sulfur poisoning regeneration is smaller than the richness during rich spike processing but greater than the richness during DPF regeneration processing.

Sulfur poisoning regeneration and DPF regeneration are performed on the condition that the catalyst temperature is at least equal to or greater than the first predetermined temperature TcatH (temperature regions I, II). It should be noted, however, that sulfur poisoning regeneration and DPF regeneration may also be performed when the catalyst temperature is equal to or greater than the second predetermined temperature TcatHH (temperature region I only).

When the vehicle decelerates during sulfur poisoning regeneration of the NOx trap catalyst or DPF regeneration, the torque required for traveling decreases. Accordingly, the engine load decreases such that the high temperature conditions required for the regeneration processing described above are no longer satisfied, and as a result, the regeneration processing is interrupted, possibly leading to a large reduction in regeneration efficiency.

Hence, in the third embodiment, fuel cuts are prohibited during sulfur poisoning regeneration or DPF regeneration when deceleration occurs in the temperature region II. Further, the engine load is increased during deceleration to maintain the high temperature and the rich state, and the power for the increase in the engine load is regenerated by the motor/generator 3.

Figure 13:
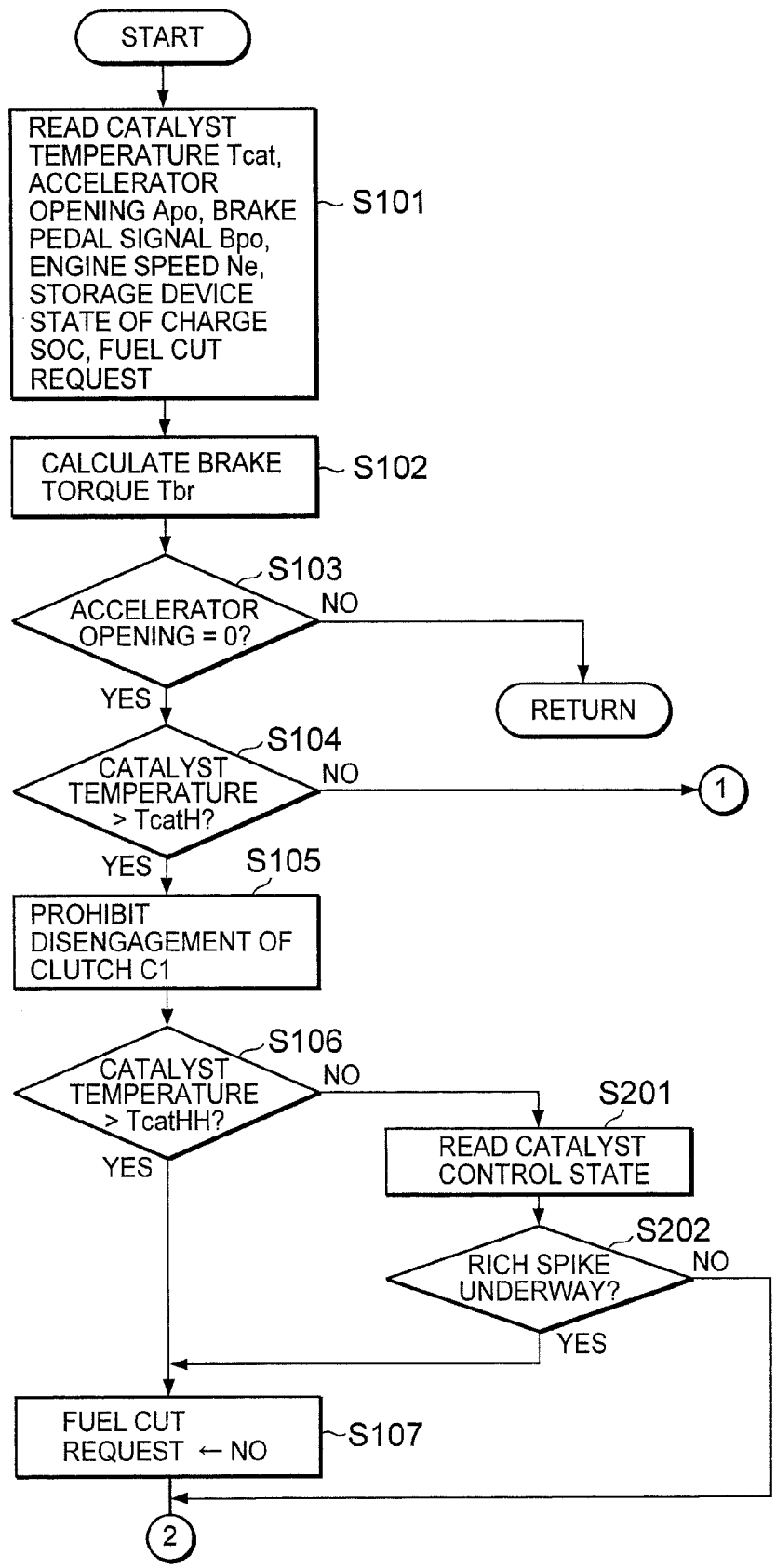
FIG. 13 is a flowchart showing an initial stage of control according to the third embodiment.
Figure 14:
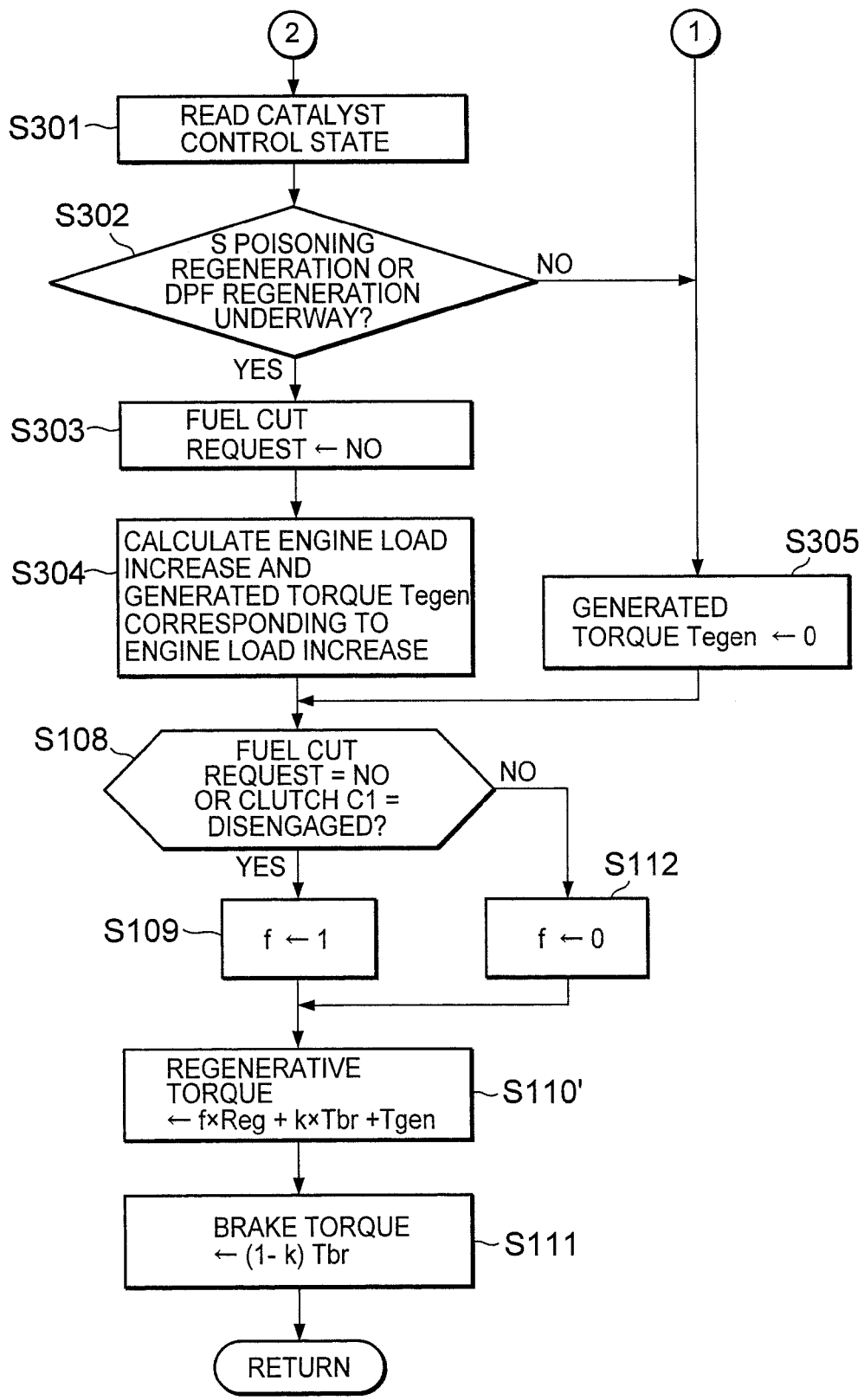
FIG. 14 is a flowchart showing a latter stage of the control according to the third embodiment.

FIGS. 13 and 14 show a control flow of the third embodiment. The processing up to the step S107 in FIG. 13 is identical to the processing up to the step S107 shown in FIG. 10. When the catalyst temperature Tcat is higher than the first predetermined temperature TcatH, processing is performed up to the step S107, whereupon the processing of steps S301 to S305 in FIG. 14 is performed before advancing to the step S108.

In the step S301, the catalyst control state is read, whereupon the routine advances to the step S302. In the step S302, a determination is made as to whether or not at least one of sulfur poisoning regeneration of the NOx trap catalyst and DPF regeneration is underway. When regeneration processing is determined to be underway, fuel cuts are prohibited in the step S303, whereupon the routine advances to the step S304. In the step S304, the increase in the engine load (the increase in the fuel injection amount) and a generated torque Tegen of the motor/generator 3 corresponding to the increase in the engine load are calculated in the following manner.

Figure 15:
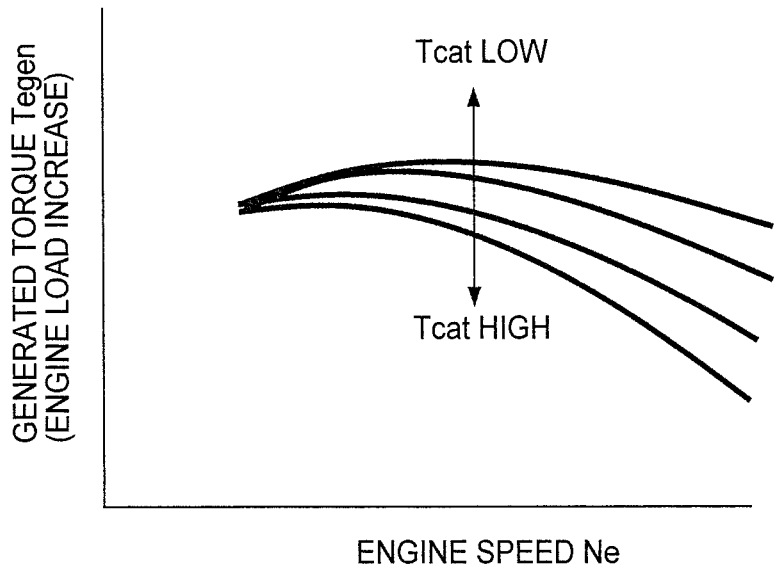
FIG. 15 is a map for setting a basic value of a power generation torque Tegen used in the third embodiment.

First, a basic value of the generated torque Tegen (=engine load increase) is set on the basis of the engine rotation speed Ne and the catalyst temperature Tcat by referring to a data map shown in FIG. 15. More specifically, the generated torque Tegen is set to increase as the catalyst temperature Tcat falls and to decrease as the catalyst temperature Tcat rises, whereby the catalyst temperature during regeneration is increased or maintained at a high temperature. Further, an exhaust gas flow (supplied heat amount) increases as the engine rotation speed Ne increases, and therefore the generated torque Tegen is set to decrease as the engine rotation speed Ne increases.

Figure 16:
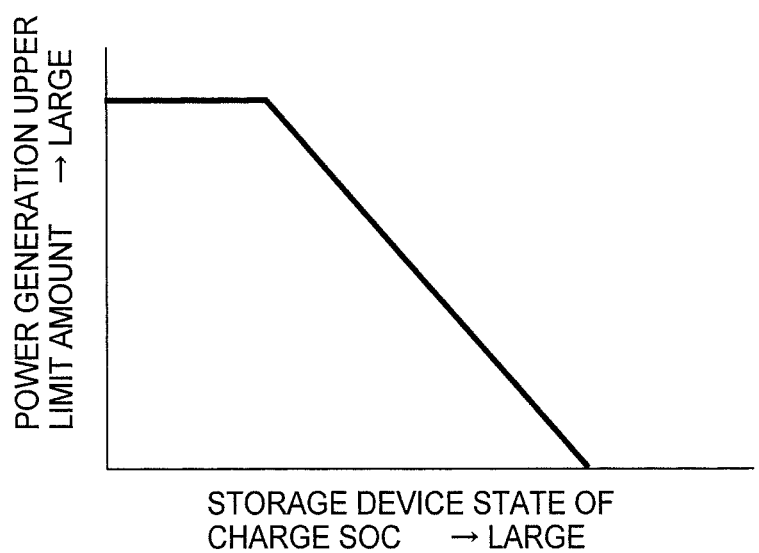
FIG. 16 is a map showing a power generation upper limit amount relative to a state of charge SOC of a storage device, which is used in the third embodiment.

Further, as shown in FIG. 16, when the state of charge (charge amount) SOC of the battery or other storage device is large, the surplus power that can be regenerated (a power generation upper limit amount) decreases. Therefore, the basic value of Tegen calculated using the method described above is compared with the power generation upper limit amount, and a value obtained through limit processing using the power generation upper limit amount as an upper limit is set as the final engine load increase and generated torque Tegen.

Next, the processing of the step S108 onward is performed. In a step S110', the generated torque Tegen is added while calculating the regenerative torque of the motor/generator 3. In other words, a target regenerative torque of the motor/generator 3 is calculated using the following Equation (2).

$$\text{Target regenerative torque} = f \times \text{Reg} + k \times \text{Tbr} + \text{Tegen} \quad (2)$$

On the other hand, when the catalyst temperature Tcat is equal to or lower than the first predetermined temperature TcatH and neither sulfur poisoning regeneration nor DPF regeneration is underway, the routine advances to the step S305. In the step S305, the generated torque Tegen is set at zero, after which the routine advances to the step S108.

Thus, during sulfur poisoning regeneration or DPF regeneration, in addition to permitting power regeneration so as to continue the engine operation, the engine load is actively increased so that regeneration control is continued for as long as possible while maintaining the temperature required for the regeneration. As a result, the frequency of reheating caused by interruptions in the regeneration can be reduced, thereby suppressing deterioration of the fuel economy. Furthermore, electric power for the increase in the engine load is regenerated, and therefore the total fuel economy and exhaust gas purification performance can be improved even further without affecting the deceleration performance.

It should be noted that when the temperature conditions for regeneration processing are substantially unsatisfied by the increase in the engine load, which is limited by the power generation upper limit amount, such that regeneration processing cannot be performed, the regeneration processing should be stopped quickly and processing should shift to the control for reducing the catalyst temperature described in the first embodiment. In other words, after setting a regeneration prohibition flag and setting Tegen=0, the routine advances to the step S108, bypassing the processing of the steps S301 to S305.

FIG. 17 is a view showing operations of each element of the third embodiment. In FIG. 17, "regeneration underway" indicates that sulfur poisoning regeneration or DPF regeneration is underway.

Figure 18:
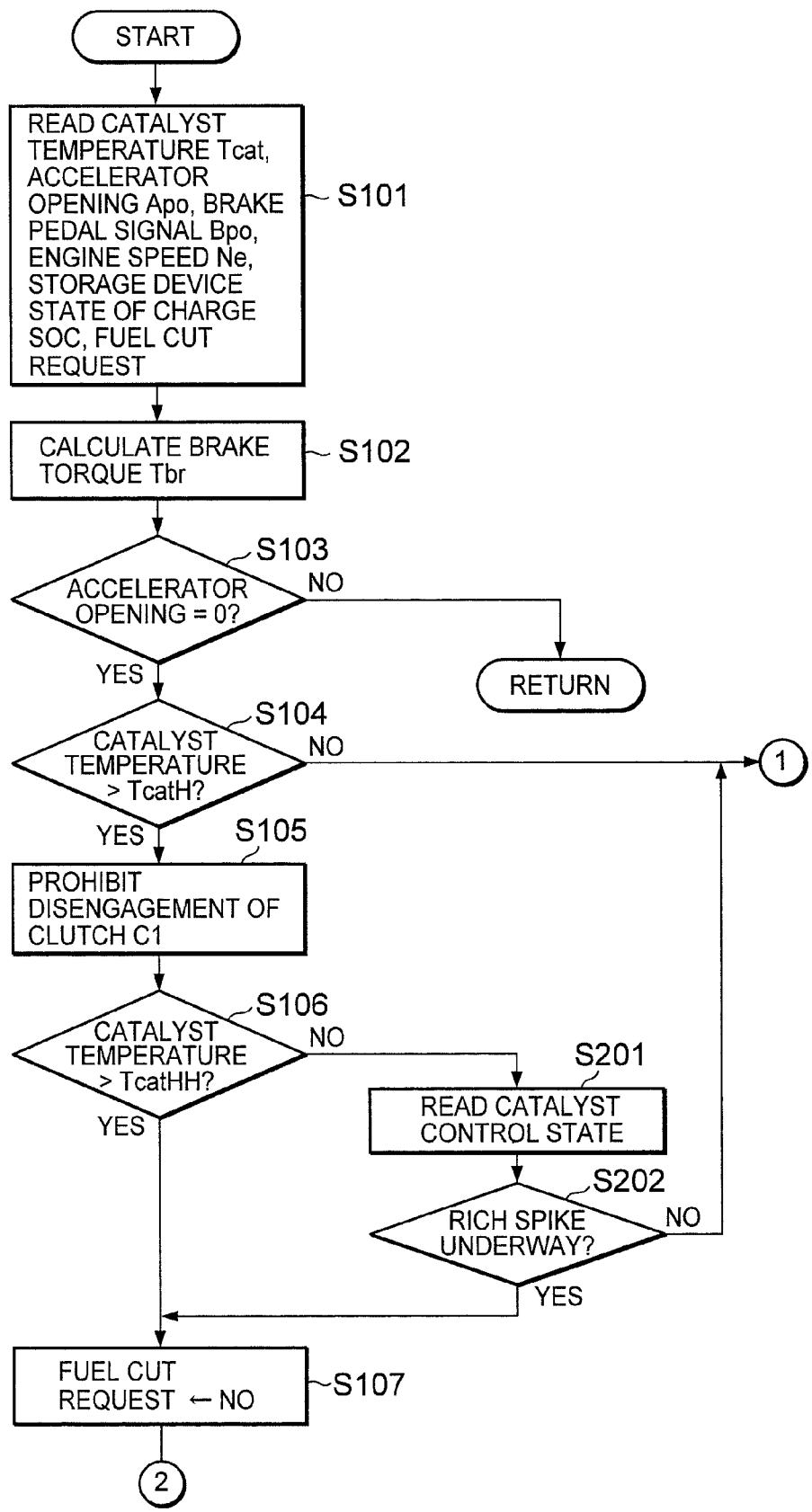
FIG. 18 is a flowchart showing an initial stage of control according to a fourth embodiment.

In the above description, sulfur poisoning regeneration and DPF regeneration are performed in the temperature regions I and II, but as noted above, regeneration may be performed in the temperature region I alone. FIG. 18 shows the initial stage of a processing flow in this case (a fourth embodiment). The latter stage of the processing flow is identical to the flow shown in FIG. 14.

It should be noted that a vehicle (hybrid vehicle) having a hybrid motor is heavier than a conventional vehicle of the same class, and the load thereof during continuous high-speed travel is higher. Further, a hybrid vehicle often uses an operating point having a favorable fuel economy, but the load in the corresponding region is comparatively high and the exhaust temperature is also high. Therefore, the frequency with which the catalyst is used under severe conditions is high. However, according to the first to fourth embodiments described above, durability can be secured in the catalyst during deceleration of the vehicle while maintaining the deceleration performance, fuel economy and exhaust gas purification performance at favorable levels.

Although the invention has been described above by reference to certain embodiments of the invention, the invention is not limited to the embodiments described above. Modifications and variations of the embodiments described above will occur to those skilled in the art, within the scope of the claims.

For example, in the step S107 of the flowcharts shown in FIGS. 5, 10, 13 and 18, the oxygen content of the exhaust gas in the exhaust system is reduced by prohibiting fuel cuts. However, the oxygen content of the exhaust gas in the exhaust system may be reduced by another method.

The entire contents of Japanese Patent Application P2007-205683 (filed on Aug. 7, 2007) are incorporated herein by reference.

What is claimed is:

1. A control device for a hybrid motor comprising an internal combustion engine and an electric motor, which are connected via a clutch, the control device comprising:
   a temperature detection unit configured to detect a temperature of an exhaust gas purification catalyst interposed in an exhaust system of the internal combustion engine; and
   an internal combustion engine control unit configured to:
      stop the internal combustion engine when a predetermined deceleration condition is established,
      maintain a rotation of the internal combustion engine with a fuel cut when the temperature of the exhaust gas purification catalyst is higher than a first predetermined temperature, which is higher than an activity start temperature of the exhaust gas purification catalyst, even if the predetermined deceleration condition is established, and
      maintain the rotation of the internal combustion engine without the fuel cut when the temperature of the exhaust gas purification catalyst is higher than a second predetermined temperature, which is higher than the first predetermined temperature.

2. The control device for a hybrid motor as defined in claim 1, further comprising:
   a brake operation detection unit configured to detect whether or not a brake is operative; and
   a power regeneration control unit configured to:
      perform power regeneration by causing the electric motor to function as a power generator when the predetermined deceleration condition is established, and
      prohibit the power regeneration performed by the electric motor when a fuel supply to the internal combustion engine is stopped and the brake is inoperative, even if the predetermined deceleration condition is established.

3. The control device for a hybrid motor as defined in claim 1, further comprising:
   a brake operation detection unit configured to detect whether or not a brake is operative; and
   a power regeneration control unit configured to:
      perform power regeneration by causing the electric motor to function as a power generator when the predetermined deceleration condition is established, and
      cause the electric motor to regenerate power using a part of a braking force during deceleration when the brake is operative.

4. The control device for a hybrid motor as defined in claim 1, wherein:
   the exhaust gas purification catalyst comprises a NOx trap catalyst, and
   the internal combustion engine control unit is configured to prohibit the fuel cut when the NOx trap catalyst releases and purifies trapped NOx, even if the temperature of the exhaust gas purification catalyst is equal to or lower than the second predetermined temperature.

5. The control device for a hybrid motor as defined in claim 1, wherein:
   the exhaust gas purification catalyst comprises a NOx trap catalyst, and
   the internal combustion engine control unit is configured to maintain the rotation of the internal combustion engine without the fuel cut during removal of poisoned sulfur from the NOx trap catalyst.

6. The control device for a hybrid motor as defined in claim 5, further comprising a power regeneration control unit configured to permit power regeneration by the electric motor during the removal of poisoned sulfur from the NOx trap catalyst, even when the brake is inoperative.

7. The control device for a hybrid motor as defined in claim 6, wherein:
   the power regeneration control unit is configured to increase a power regeneration amount beyond that of a normal power regeneration operation during the permitted power regeneration by the electric motor, and
   the internal combustion engine control unit is configured to perform control to increase a load of the internal combustion engine in accordance with an increase in the power regeneration amount.

8. The control device for a hybrid motor as defined in claim 5, further comprising:
   a power regeneration control unit that permits regeneration of power using a part of a braking force when the temperature of the exhaust gas purification catalyst is higher than the second predetermined temperature,
   wherein the internal combustion engine control unit is configured to:
      permit the fuel cut when the temperature of the exhaust gas purification catalyst is higher than the first predetermined temperature and equal to or lower than the second predetermined temperature once the removal of poisoned sulfur from the NOx trap catalyst is complete, and
      prohibit the fuel cut when the temperature of the exhaust gas purification catalyst is higher than the second predetermined temperature.

9. The control device for a hybrid motor as defined in claim 1, wherein:
   the exhaust gas purification catalyst comprises a particulate filter, and
   the internal combustion engine control unit is configured to maintain the rotation of the internal combustion engine without the fuel cut during removal of particulate trapped in the particulate filter.

10. The control device for a hybrid motor as defined in claim 9, further comprising a power regeneration control unit configured to permit power regeneration by the electric motor during the removal of particulate trapped in the particulate filter, even when the brake is inoperative.

11. The control device for a hybrid motor as defined in claim 10, wherein:
   the power regeneration control unit is configured to increase a power regeneration amount beyond that of a normal power regeneration operation during the permitted power regeneration by the electric motor, and
   the internal combustion engine control unit is configured to increase a load of the internal combustion engine in accordance with an increase in the power regeneration amount.

12. The control device for a hybrid motor as defined in claim 9, further comprising:

a power regeneration control unit that permits regeneration of power using a part of a braking force when the temperature of the exhaust gas purification catalyst is higher than the second predetermined temperature, wherein the internal combustion engine control unit is configured to:

permit the fuel cut when the temperature of the exhaust gas purification catalyst is higher than the first predetermined temperature and equal to or lower than the second predetermined temperature which is higher than the first predetermined temperature once the removal of particulate trapped in the particulate filter is complete, and prohibit the fuel cut when the temperature of the exhaust gas purification catalyst is higher than the second predetermined temperature.

13. The control device for a hybrid motor as defined in claim 1, wherein, when the temperature of the exhaust gas purification catalyst is higher than the second predetermined temperature, a fuel injection amount is set such that a net torque of the internal combustion engine is zero.

14. A control device for a hybrid motor comprising an internal combustion engine and an electric motor, which are connected via a clutch, the control device comprising:

a means for detecting a temperature of an exhaust gas purification catalyst interposed in an exhaust system of the internal combustion engine; and a control unit configured to perform the steps of:

stopping the internal combustion engine when a predetermined deceleration condition is established, maintaining a rotation of the internal combustion engine with a fuel cut when the temperature of the exhaust gas purification catalyst is higher than a first predetermined temperature, which is higher than an activity start temperature of the exhaust gas purification catalyst, even if the predetermined deceleration condition is established, and maintaining the rotation of the internal combustion engine without the fuel cut, when the temperature of the exhaust gas purification catalyst is higher than a second predetermined temperature, which is higher than the first predetermined temperature.

15. A control method for a hybrid motor comprising an internal combustion engine and an electric motor, which are connected via a clutch, the control method comprising:

detecting a temperature of an exhaust gas purification catalyst interposed in an exhaust system of the internal combustion engine;

stopping the internal combustion engine when a predetermined deceleration condition is established;

maintaining a rotation of the internal combustion engine with a fuel cut when the temperature of the exhaust gas purification catalyst is higher than a first predetermined temperature, which is higher than an activity start temperature of the exhaust gas purification catalyst, even if the predetermined deceleration condition is established; and maintaining the rotation of the internal combustion engine without the fuel cut, when the temperature of the exhaust gas purification catalyst is higher than a second predetermined temperature, which is higher than the first predetermined temperature.

\* \* \* \* \*